United States Patent [19]

Pearce

[11] Patent Number: 4,826,607

[45] Date of Patent: May 2, 1989

[54] METHOD OF AND APPARATUS FOR FILTERING A SLURRY

[75] Inventor: Kenneth W. Pearce, County Cleveland, England

[73] Assignee: Steetley Quarry Products Limited, United Kingdom

[21] Appl. No.: 35,930

[22] Filed: Apr. 8, 1987

[30] Foreign Application Priority Data

Apr. 21, 1986 [GB] United Kingdom ................. 8609647

[51] Int. Cl.⁴ ............................................ B01D 25/12
[52] U.S. Cl. ..................................... 210/770; 100/113; 100/194; 100/211; 210/225; 210/231; 210/359; 210/398; 210/406; 210/416.1; 210/780; 210/808
[58] Field of Search ............... 210/224, 225, 227, 228, 210/231, 332, 406, 416.1, 770, 780, 359, 398, 808; 100/194, 211, 113

[56] References Cited

U.S. PATENT DOCUMENTS

| | | | |
|---|---|---|---|
| 1,705,908 | 7/1927 | Witt | 210/356 |
| 2,724,508 | 11/1955 | Luther | 100/211 |
| 3,180,825 | 4/1965 | Couvreur et al. | 210/351 |
| 3,289,845 | 5/1963 | Weber | 210/231 |
| 3,613,563 | 10/1971 | Sumskay et al. | 100/211 |
| 3,655,049 | 4/1972 | Krachlaner | 210/388 |
| 3,695,440 | 10/1972 | Mori | 210/228 |
| 3,807,567 | 4/1974 | Iwatani | 210/231 |
| 3,957,645 | 4/1976 | Karita et al. | 210/231 |
| 4,397,746 | 8/1983 | Kratochvil | 210/228 |
| 4,425,233 | 1/1984 | Oelbermann | 210/231 |
| 4,608,164 | 8/1986 | Neu | 210/231 |

FOREIGN PATENT DOCUMENTS

| | | | |
|---|---|---|---|
| 708441 | 4/1965 | Canada | 210/228 |
| 0027910 | 5/1964 | European Pat. Off. . | |
| 3027997 | 3/1982 | Fed. Rep. of Germany | 210/416.1 |
| 1344160 | 1/1974 | United Kingdom . | |
| 1422390 | 1/1976 | United Kingdom . | |
| 1433764 | 4/1976 | United Kingdom | 210/356 |
| 1512960 | 5/1978 | United Kingdom . | |
| 2077131 | 12/1981 | United Kingdom . | |
| 2132105 | 7/1984 | United Kingdom . | |

*Primary Examiner*—W. Gary Jones
*Attorney, Agent, or Firm*—Bacon & Thomas

[57] ABSTRACT

Filter cake produced from a slurry is compressed in an enclosure (6) having a pair of opposed flexible walls (5) at least one of which is constituted by a filter and drainage medium. The filter cake is cyclically deformed while under compression with the filter cake supported at least one position (14, 52) within its periphery whereby the unsupported parts of the filter cake are cyclically deformed about the periphery and the position or positions of support. All parts of the filter cake are thus subjected to substantially uniform bending whereby drying of the filter cake is improved.

19 Claims, 9 Drawing Sheets

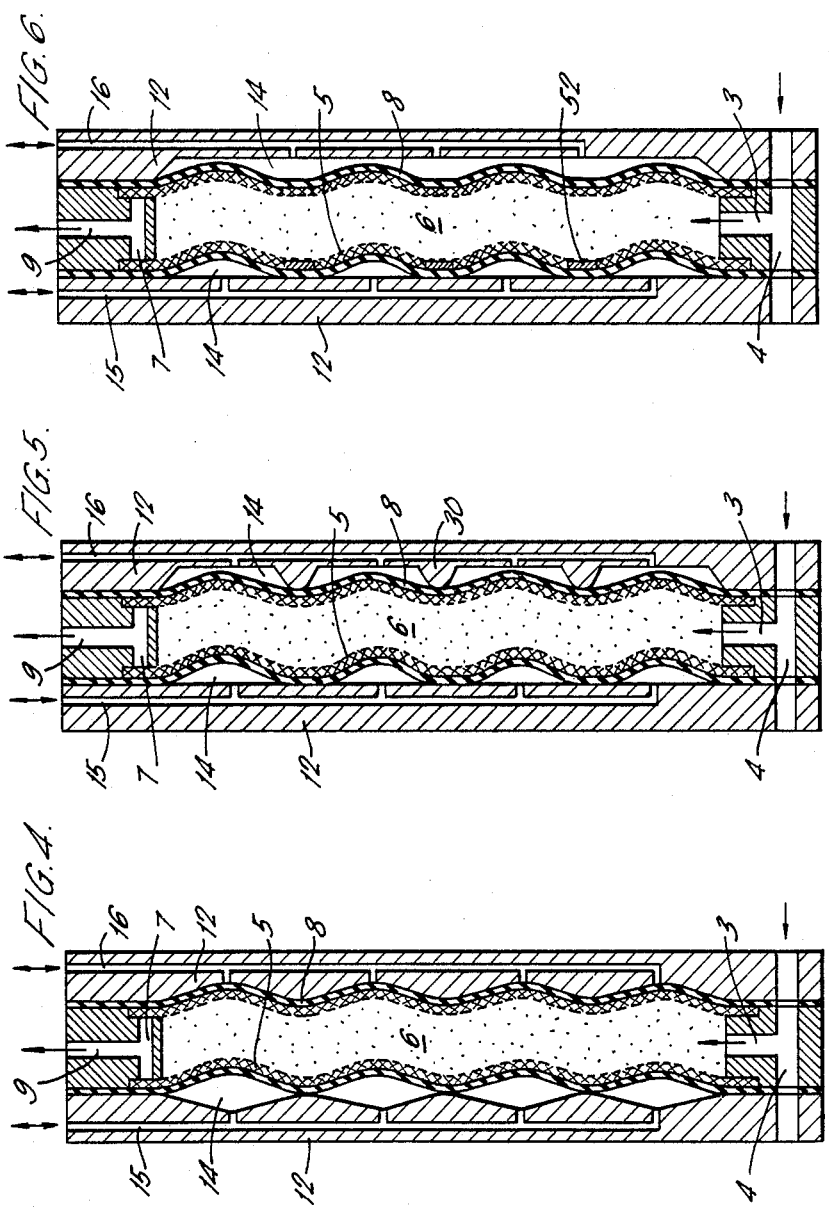

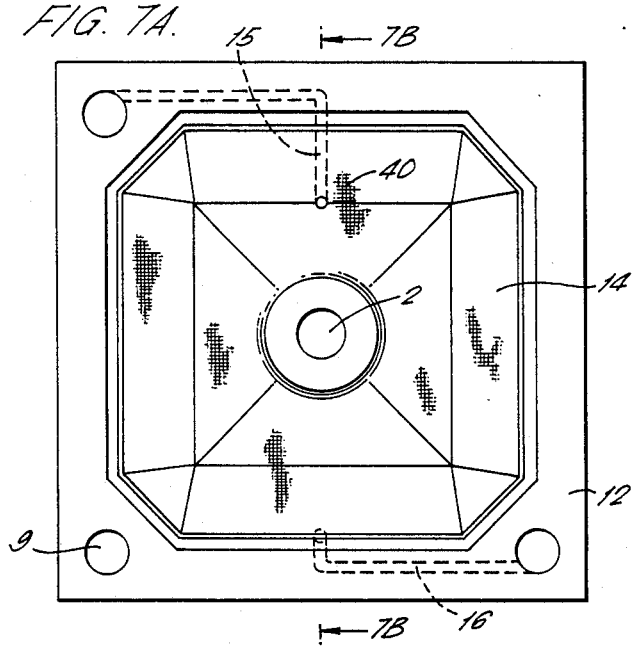
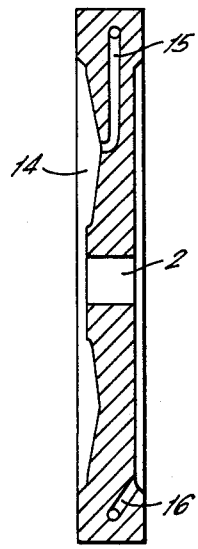

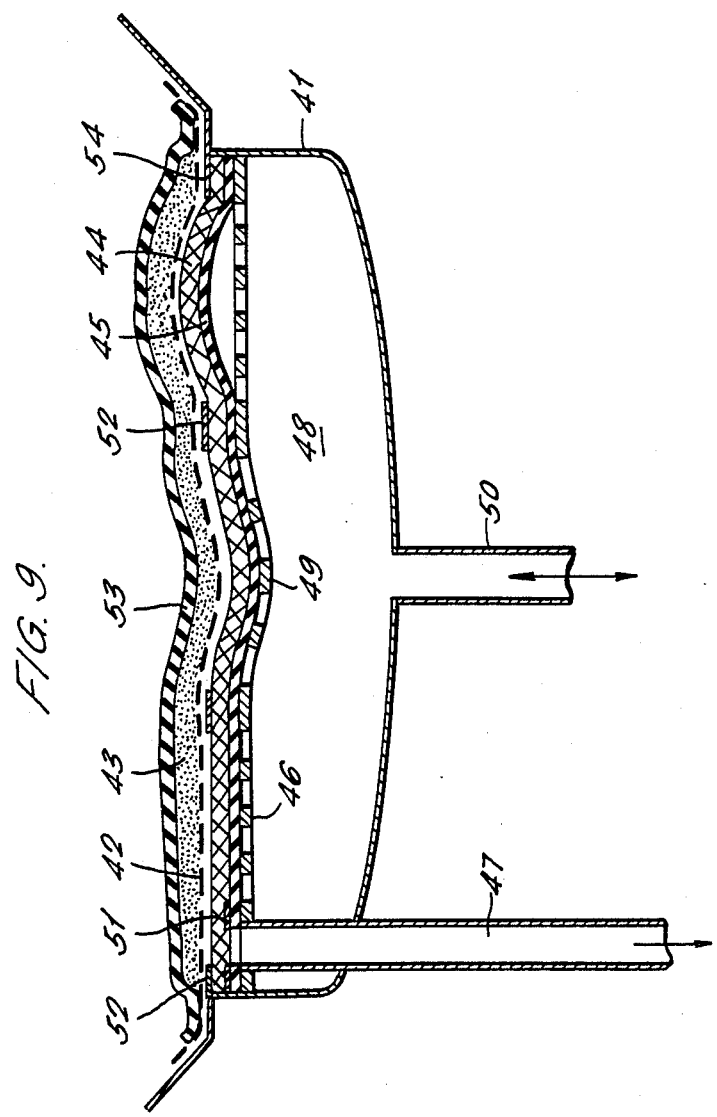

METHOD OF AND APPARATUS FOR FILTERING A SLURRY

This invention relates to a method of and apparatus for filtering a slurry.

In GB-A-2132105 there is disclosed a method of filtering a slurry in which filter cake formed from the slurry is confined in a chamber having a pair of opposed flexible walls at least one of which is constituted by a filter and drainage medium, the filter cake being compressed in the chamber and then cyclically deformed while under compression by acting on the opposed walls of the chamber to cause the filter cake to bow.

There is also disclosed apparatus for carrying out such a method.

While the method set out above is generally adequate for dewatering most filter cakes, it has been found that the substantially non uniform bending to which the major part of the filter cake is subjected does not result in maximum dewatering, particularly with relatively large surface area filter cakes.

According to this invention there is provided a method of filtering a slurry, comprising confining filter cake produced from the slurry in an enclosure having a pair of opposed walls at least one of which is flexible and at least one of which is constituted by a filter and drainage medium; compressing the filter cake in the enclosure; and cyclically deforming the filter cake while under compression in the enclosure by acting on at least one of the walls of the enclosure while supporting the compressed filter cake at a plurality of discrete positions within its periphery whereby the unsupported parts of the filter cake are cyclically deformed about the periphery and said position or positions of support of the filter cake.

Said supporting of the filter cake may be effected by fastening the or a filter and drainage medium flexible wall to prevent movement thereof.

Otherwise the compressed filter cake may be urged against a surface having cavities into which the enclosure and filter cake are deformed, said supporting of the filter cake being effected by the edges of said cavities.

The cavities may be substantially hemispherical or angular, the total angle of the cavities preferably being obtuse. Any cavity may be in the form of a cone, pyramid, groove, fluting, sinusoidal corrugation or the like. The shape of each cavity is desirably such that a substantially uniform degree of deformation is imposed on all parts of the filter cake when it is forced into adopting the shape of the cavities.

The surfaces of the cavities may be ribbed or pimpled.

Desirably the cavities are interconnected such that any fluid therein is expressed therefrom, and does not become trapped in closed pockets.

Filter cake can be formed in the enclosure by initial compression of slurry therein.

Preferably the filter cake in the enclosure is compressed by fluid pressure acting on both of said walls of the enclosure, in which case said cyclic deformation of the compressed filter cake can be effected by pressure oscillations induced in said fluid pressure.

If vacuum filtration is being used compression of the filter cake in the enclosure can be obtained by the application of subatmospheric pressure to the enclosure and atmospheric or superatmospheric pressure to the outside of said walls of the enclosure.

Also according to this invention there is provided apparatus for filtering a slurry, comprising an enclosure having a pair of opposed walls at least one of which is flexible and at least one of which is constituted by a filter and drainage medium; means to maintain filter cake produced from the slurry under compression in the enclosure; means to support the compressed filter cake at at least one position within its periphery; and means for cyclically deforming the filter cake while under compression in the enclosure by acting on at least one of the walls of the enclosure whereby the unsupported parts of the filter cake are cyclically deformed about the periphery and said position or positions of support of the filter cake.

Said walls of the enclosure can each comprise an outer flexible membrane impermeable to fluids.

Preferably said flexible membrane at a wall of the enclosure comprising the filter and drainage medium is supported by a rigid perforated plate, the flexible membrane and the medium being secured to the plate at said position or positions of support of the filter cake.

The filter and drainage medium and flexible membrane may be fixed to the perforated plate in a variety of formations subject to the condition that the flexible membrane must be capable of being deformed between the positions. For instance, the positions may be points located at the junctions of a matrix of squares, rectangles, diamonds or the like.

The means for cyclically deforming the compressed filter cake may be an enclosed space one wall of which is formed by the perforated plate, and means for varying the pressure in the enclosed space, the peak pressure being such as to deform the filter cake, the filter and drainage layer and the flexible membrane.

In a vacuum filtration system, there can be an aperture in the flexible membrane at one of the support positions, and means to connect the aperture to a source of suction so as to transmit this suction to the filter and drainage medium and thereby extract liquid from the filter cake.

The perforated plate may be corrugated in such a manner that the peaks of the corrugations lie beneath the flexible membrane support points and the troughs lie between such points. By using such corrugations the deformation of the filter cake may be made convex towards the vacuum side as well as concave.

The means for varying the pressure in the enclosed space can comprises a valve system whereby the enclosed space is alternately connected to the pressure and then suction side of a pump or fan. A suitable valve system is a pair of continuously rotating, synchronised butterfly valves.

The filter and drainage medium can comprise a layer of filter cloth and a layer of drainage mesh. However, it may comprise a layer of filter cloth and a flexible membrane having a rough surface adjacent the layer of filter cloth. The roughness can be provided by a series of flexible ribs, pimples or channels formed on the membrane. This invention will now be described by way of example with reference to the drawings, in which:

FIGS. 4, 5 and 6 are cross-sectional views showing three enclosures for use in the method of this invention;

FIGS. 7A and 7B are an end view and a cross-sectional view of a plate for use as one wall of an enclosure for use in the method of this invention;

FIG. 9 is a diagrammatic cross-sectional view of a vacuum filtration device according to this invention;

Figure 1:
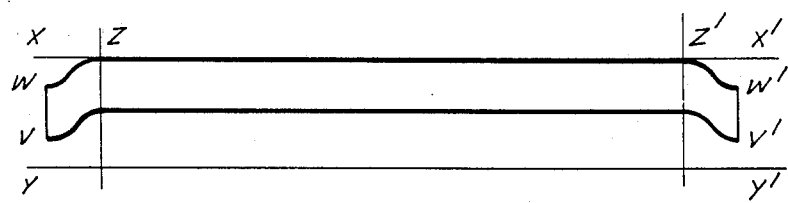
FIG. 1 illustrates deformation of a filter cake as occurs in the known method of filtering discussed above.
Figure 11:
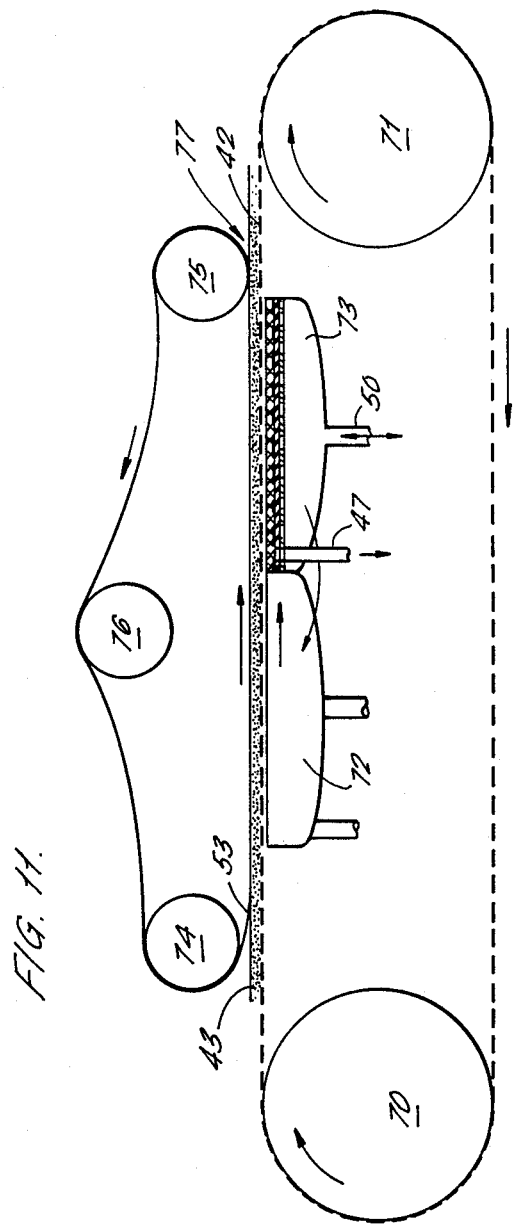
Figure 12A:
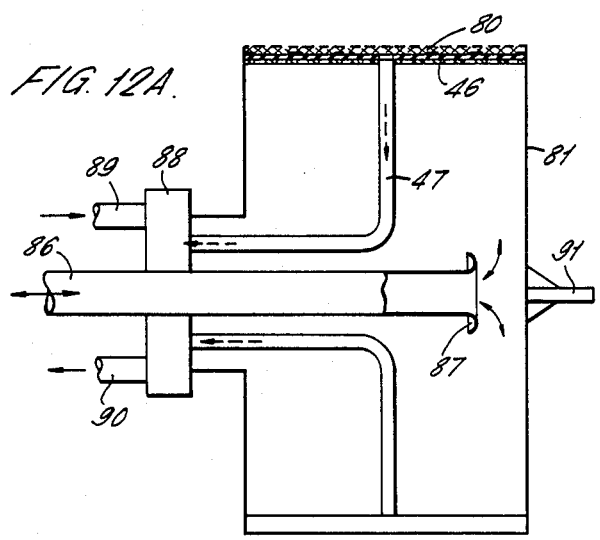
Figure 12B:
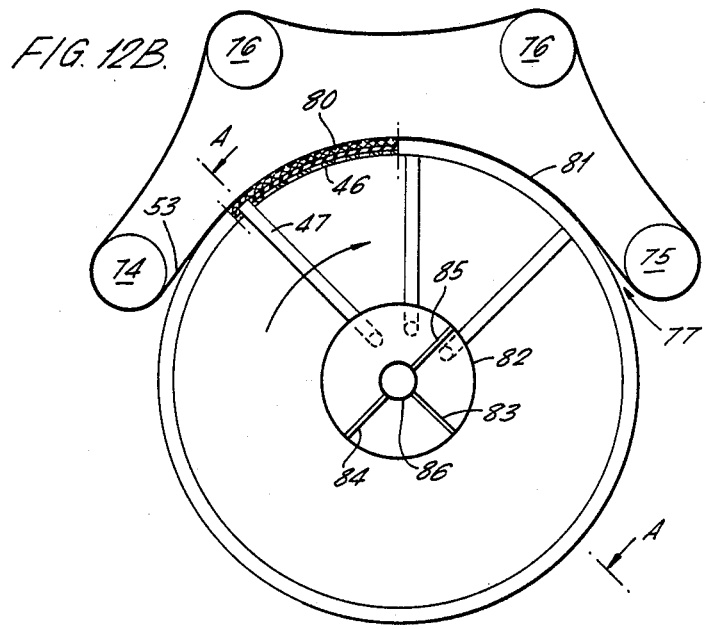

FIG. 11 is a diagrammatic illustration showing a side view of a continuous horizontal belt filter according to this invention; and FIGS. 12A and 12B show diagrammatic axial and radial cross-sectional views of a rotary drum filter according to this invention. FIG. 1 shows a filter cake of wide unsupported span being deformed between two flat surfaces ($XX^1$ and $YY^1$) by the application of different fluid pressures to the two sides of the filter cake. When deformation occurs the major part of the filter cake lying between the points Z and $Z^1$ remains flat and experiences little or no shear strain. As a consequence it is found that the outer edges of the filter cake (WZ and $W^1Z^1$) are dewatered to a greater degree than the middle. To extract liquid effectively the filter cake should be caused to deform to a similar degree across its entire width.

This effect may be obtained by constraining the cake at intermediate points, so that the unsupported span is reduced, and the degree of shear strain is increased for a given displacement in the direction of the fluid pressures.

Figure 2:
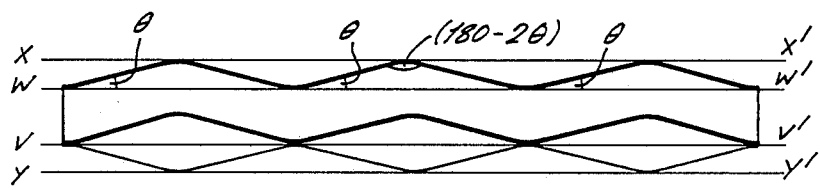
FIG. 2 illustrates deformation of a filter cake as occurs in the method of this invention.

FIG. 2 shows this effect where the filter cake is forced into three cavities all with the same angle of shear '$\theta$' and the same cavity total angle ($180 - 2\theta$).

Figure 3:
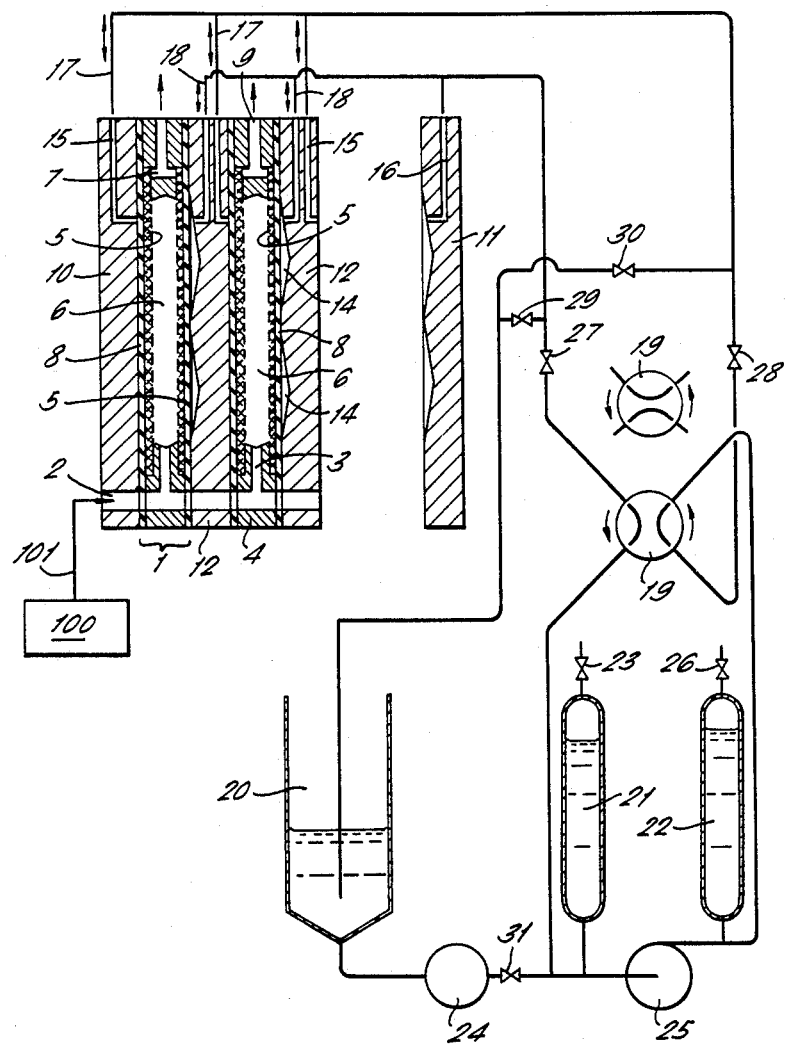
FIG. 3 is a diagrammatic cross-sectional view of a filter press in accordance with this invention.
Figure 8C:
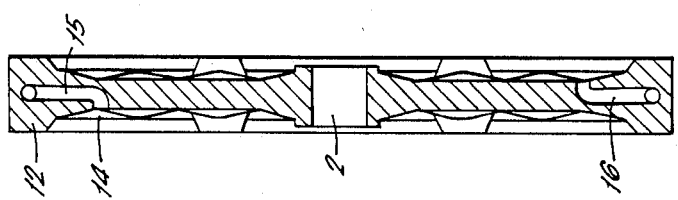
FIGS. 8A, 8B and 8C are an end and two cross-sectional views of another plate of the type shown in FIGS. 7A and 7B.
Figure 8B:
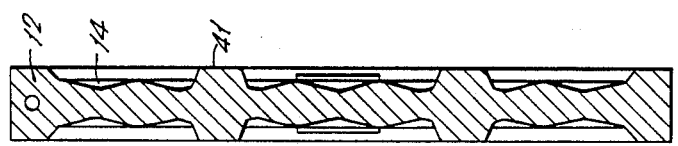
Figure 8A:
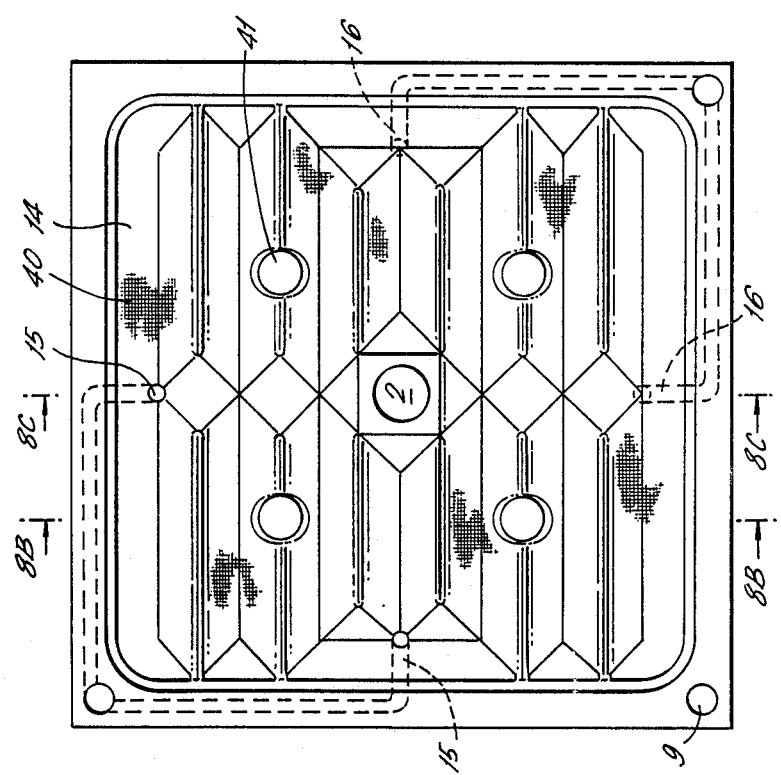

FIG. 3 illustrates a filter press according to this invention, comprising a series of filtration units 1 arranged in line between a pair of end covers 10 and 11 and separated by rigid plates 12. Each unit 1 comprises a central annular member 4 of metal sandwiched between a pair of flexible filter and drainage media 5 formed, for example of moulded or woven plastics material or woven metal mesh. The member 4 and filter and drainage media 5 define an enclosure 6, with filter and drainage media 5 constituting a pair of opposed flexible walls of the enclosure 6. Each unit 1 is completed by a pair of flexible impervious membranes 8 between which the other members of the unit 1 are sandwiched. The membranes 8 can be made of, for example, moulded and reinforced natural or synthetic rubber, or moulded and reinforced plastics material. The combination of flexible impermeable membrane 8 and flexible drainage and filter media 5 may be replaced with equal effectiveness by a two layer membrane and a filter cloth. The membrane layer adjacent to the filter cloth may be ribbed or pimpled so as to make it into a permeable drainage layer. That part of the membrane away from the filter cloth would be flexible and impermeable.

Typically the complete press will include 10 or more of the filtration units 1 sandwiched between the end covers 10 and 11 and separated by the plates 12.

One end plate 11 and all the separating plates 12 have cavities 14 machined out of one face. The width of each cavity will depend on the stiffness of the compressed filter cake but typically lies in the range of 5 to 15 times the cake thickness, and the depth of each cavity lies between ½ and 2 filter cake thicknesses. Also included in the end plates and separating plates are access bores 15 and 16 to permit the entry and escape of hydraulic fluid into and out of the cavities 14.

The central annular members 4 and end cover 10 contain bores 2 and 3 to permit the supply of feed slurry to the enclosures 6, and bores 7 and 9 to allow the escape of filtrate from enclosures 6 via the filtration and drainage media 5.

Each central annular member 4 may be divided into two equal parts, each part being attached to the adjacent end plate (10, 11) or separating plate 12 thereby clamping the flexible membranes 8 and the filtration and drainage media 5 into position. If this divided construction is used then the filter press is a recessed plate press, rather than a plate and frame press as when single piece members 4 are used.

Another possible construction is to have cavities 14 in both end plates 10 and 11, and in both faces of separating plates 12. By this means a bigger deflection of the filter cakes is made possible, but the separating plates 12 need to be thicker and heavier to accommodate both cavities.

Hydraulic fluid to pressurise cavities 14 is supplied through lines 17 and 18 which are connected to reservoir 20 and pumps 24 and 25 through a rotary valve 19. Pressurisable vessels 21 and 22 are provided with valves 23 and 26 and are connected to lines 17 and 18. A variety of valves 27, 28, 29, 30 and 31 are also provided.

The operation of the press is as follows.

Slurry from pump 100 is fed into the enclosures 6 by way of feed line 101 and the bores 2 and 3, and filtrate escapes by way of bores 7 and 9 allowing filter cake to build up in enclosures 6. During this cake formation period valves 27 and 28 are closed and valves 29 and 30 are open allowing hydraulic fluid to be drained from the cavities 14 into the vessel 20. When cake formation is complete the slurry feed is stopped and the slurry feed line 101 is closed. Valves 29 and 30 are closed and valves 27, 28 and 31 are opened. At this stage valves 23 and 26 at the tops of vessels 21 and 22 are open to the atmosphere allowing the same liquid level to be reached in vessels 20, 21 and 22.

In order to squeeze the filter cakes in enclosures 6, valves 23 and 26 are closed and pump 24 is started. Hydraulic fluid is transferred from vessel 20 into vessels 21 and 22 compressing the air trapped in them and raising the pressure in the cavities 14 via the lines 17 and 18 and the four-way rotary valve 19. Pump 24 is constructed so that it maintains a preset pressure in the hydraulic system, either by stopping and starting automatically, or by relieving itself through a pressure controlled valve (not shown).

When the liquid expression from the filter cakes in the enclosures 6 has ceased a further liquid removal is obtained by starting pump 25. This pump is constructed to generate a small pressure differential with a high volume flow rate unlike pump 24 which develops a high pressure at a low flow rate. The effect of pump 25 in combination with rotary valve 19 is to cause the membranes 8 and the filter cakes in enclosures 6 to be bent alternately into the cavities 14 and then back onto the flat faces of the end plate 10 and the separating plates 12. The frequency of the filter cake vibrations will be a function of the speed of rotation of valve 19. The performance of pump 25, the resistance of the hydraulic lines and the speed of rotation of valve 19 is carefully matched to ensure that the filter cakes are fully deflected in each direction.

By this means all parts of each filter cake will be subjected to a uniform shear strain whilst being squeezed by the pressure generated by pump 24. A typical maximum value for the squeeze pressure generated by pump 24 would be 15 bar, and the shearing pressure differential developed by pump 25 might vary from 1 to 5 bar depending on the nature of the solids in the filter cake and the shape and dimensions of the enclosures 6.

In place of hydraulic fluid and pumps 24 and 25, air and two compressors may be used with equal effectiveness to generate the required squeeze and bending pressures.

FIGS. 4, 5 and 6 show three further enclosures designed to promote a uniform deformation effect as shown in FIG. 2, for use in the press of FIG. 3.

FIG. 4 shows an enclosure with two rigid side plates 12 each having a series of angular cavities 14 machined into it, and the filter cake is forced to adopt the shape of each plate 12 alternately by the application of fluid pressures to cavities 14.

FIG. 5 shows another design in which the rigid plate 12 on one side of the enclosure 6 is flat and the rigid plate 12 on the other side has cavities 14 thereon formed by a regular arrangement of ribs or other protruberances 30. Because the cavities 14 generated by the protruberances 30, have an acute profile, the adjacent flexible impermeable membrane 8 may undergo more wear and tear in the vicinity of the protruberances 30. Such additional wear may be reduced by placing a permeable wear resistant layer between the flexible impermeable membrane 8 and the plate 12, and also by restricting the volume of hydraulic fluid that flows into and out of cavities 14, thereby limiting the movement of the membranes 8.

FIG. 6 shows a third design of enclosure 6 in which both of the rigid plates 12 are flat in the region where the filter cake is bent. However, the flexible impermeable membrane 8 adjacent to one plate 12 is secured at intervals by a regular arrangement of fasteners 52. When hydraulic fluid is forced into and out of the cavities 14 the filter cake is caused to bend into a corrugated or dimpled form. With this design it is especially important to limit either the volume or the pressure of hydraulic fluid forced into cavities 14 since otherwise the flexible impermeable membrane 8 fastened by fasteners 52 may be damaged.

The enclosure 6 shown in FIG. 6 may be adapted for vacuum filtration by removing the right-hand plate 12 and applying suction to filtrate port 9. With thin filter cakes the enclosure 6 may be further simplified by removing the filter cloth and drainage layer 5 that formed part of the flexible wall adjacent to the removed plate 12. With this adaptation the filter cake 6 will be squeezed by atmospheric pressure acting on the unfastened flexible impermeable membrane 8 and a pressure varying around atmospheric acting in the cavities 14.

FIGS. 7A and 7B illustrates an alternative design of plate 12 which may be used with recessed plate presses having central slurry feed. The flexible impermeable membranes 8 not shown in FIG. 7 are fitted adjacent to the two faces of the plate 12. Four obtuse angular cavities 14 are machined out around a central slurry feed bore 2. Access bore 15 is provided to permit the entry and escape of hydraulic fluid into and out of the cavities 14. Access bore 16 is provided for the identical purpose on the flat side of the plate 12. The bottom surfaces 40 of the cavities 14 are ribbed or pimpled to ease the flow of hydraulic fluid towards the access bore 15. The same beneficial effect may be obtained either by moulding ribs or pimples on to the flexible impermeable membranes 8 on the sides adjacent to the plate 12, or by placing a permeable layer between the membrane 8 and the plate 12.

FIGS. 5, 8A, 8B and 8C illustrates another design of plate 12 which may be used with recessed plate presses of bigger size where a multiplicity of cavities are advantageous.

As with the plate shown in FIGS. 7A and 7B the impermeable flexible membranes 8 fit adjacent to the two surfaces of the plate 12. A rectangular pattern of obtuse angular cavities 14 are machined out of both sides of the plate 12 around a central slurry feed bore 2. Access bores 15 and 16 are provided to permit the entry and escape of hydraulic fluid into and out of the cavities 14. The bottom parts 40 of the cavities 14 are ribbed or pimpled to ease the flow of hydraulic fluid towards the access bores 15 and 16. Stay bosses 41 are incorporated in the plate 12 to prevent movement during filtration or dewatering.

A filtration and dewatering device adapted for vacuum filtration is shown in cross section FIG. 9.

A filter cloth 42 is either fixed to or periodically moved over a filter tray 54 and perforated plate 46, 49. Between the filter cloth 42 and the perforated plate 46, 49 are an impermeable flexible membrane 45 and a permeable flexible drainage layer 44. Attached to the bottom of the perforated plate 46, 49 is a drainage pipe 47. The upper part of the drainage pipe 47 is connected to the drainage layer 44 via a hole in the membrane 45 so that filtrate leaving filter cake 43 may pass readily into the drainage pipe 47. The flexible membrane 45 is clamped tightly to the top of the perforated plate 46, 49 immediately around the top of drainage pipe 47 so that the latter is sealed from chamber 48. A ring 51 is used for this purpose. Movement of the membrane 45 and drainage layer 44 is prevented at other selected positions by securing them to the support plate 46, 49 by means of fasteners 52 which may be clamping strips, washers, or a clamping frame. An upper flexible impermeable membrane 53 is laid down upon the top surface of the filter cake and kept in close contact by the suction applied to pipe 47.

The filter cake is dewatered by simultaneously applying a vacuum to the drainage pipe 47 and an oscillating flow of fluid into and out of the chamber 48 through pipe 50. When this is done membrane 45 is caused first to bow upward between the selected clamping positions and then to return to the perforated support plate 46, 49. When the support plate is indented as at 49 then the filter cake can be forced to adopt the shape of the indentation. This bending action is repeated so long as the oscillating flow of fluid is maintained. An oscillating fluid flow may be obtained with either a reciprocating piston or an automatic valve and rotary pump or fan combination, or an excited resonant cavity and pipe.

Figure 10:
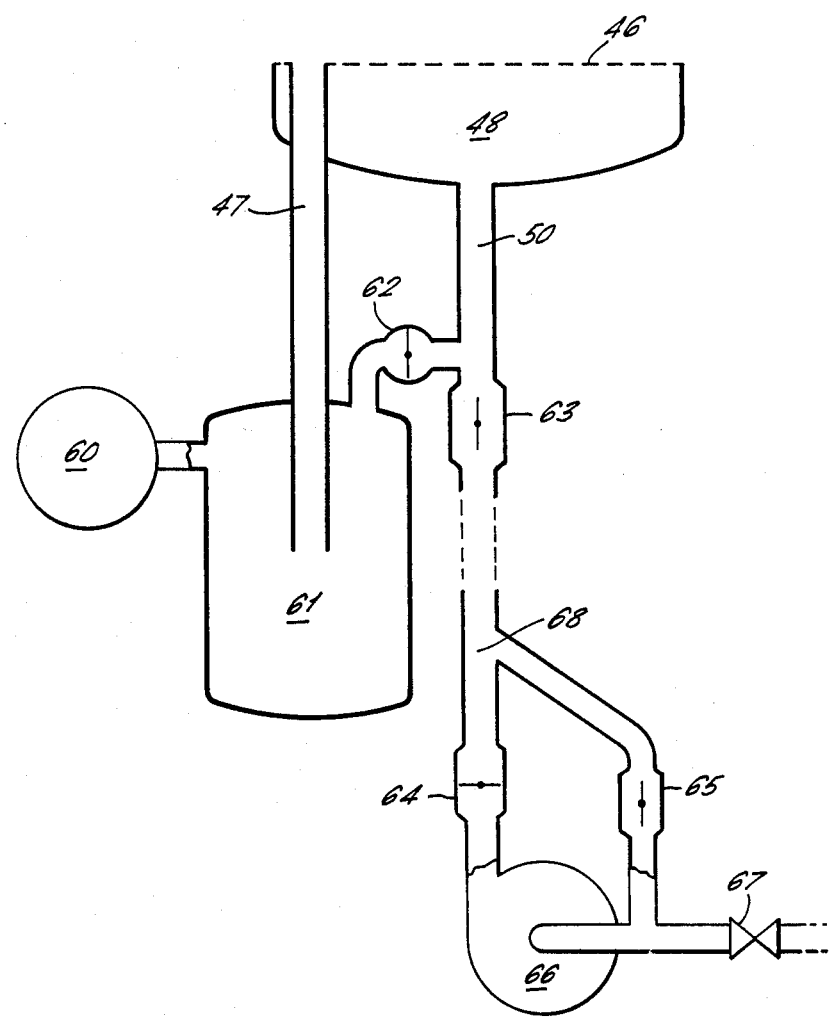
FIG. 10 is a diagrammatic illustration showing means for operating the device of FIG. 9.

FIG. 10 shows two possible systems for generating an oscillating fluid flow.

One system consists of a vacuum pump 60 and receiver 61, already used for extracting filtrate, which is connected to the chamber 48 and pipe 50 via butterfly valve 62. Butterfly valve 63 connects pipe 50 to the atmosphere. Valves 62 and 63 are rotated continuously at the same speed and linked mechanically so that when valve 63 is open valve 62 is closed. With a compressible fluid like air the chamber 48 and the pipe 50 will act as a Helmholtz resonator. If the rotational speed of valves 62 and 63 is tuned to the resonant frequency then alternate suctions and pressures will be generated in chamber 48. If the size of chamber 48 is too small to have a suitable resonant frequency, then an additional bigger chamber (not shown) which is external to the filtration and dewatering device may be connected to pipe 50.

An alternative system consists of a fan 66 and another pair of continuously rotating, mechanically linked butterfly valves 64 and 65 arranged so that valve 64 is shut when 65 is open and vice versa. Valve 64 connects to the delivery side of the fan and valve 65 to the suction side. A third valve 67 is manually controlled and connects the suction side of the fan to the atmosphere so that any air leakage from the system can be recovered. When using the alternative system for the generation of fluid flow oscillations valves 64 and 65 would be connected to pipe 50 via 'Y' piece 68. Valve 63 would either permanently open or removed and valve 62 would be permanently shut.

The vacuum filtration and dewatering device shown in FIG. 9 can either be used as a batch filter in the manner just described or it can be used as a component of a continuous vacuum filter of which there are a variety of designs in existence, such as horizontal table filters, tilting pan and belt filters, rotary drum and disc filters.

To illustrate the types of application, the designs of a suitable horizontal belt filter, and rotary drum will now be described.

One application of a device as shown in FIG. 9 is as a station located on an endless belt filter, and such a filter is shown in FIG. 11.

If the device is stationary, then the filter belt will remain stationary for a period of time to enable the dewatering process to be accomplished, and will then be moved forward quickly to enable the dewatered cake to be discharged and fresh filter cake to be presented to the dewatering device. Alternatively the filter belt may move continuously and the dewatering device may reciprocate so that it first follows the filter belt and then returns to process a fresh portion of filter cake.

These two possible modes of operation are illustrated in FIG. 11.

An endless filter cloth belt 42 travels over two rollers 70 and 71. If the belt 42 moves intermittently, then the filtration and dewatering device would occupy a permanent stationary position 73. If the belt 42 moves continuously, then the filtration and dewatering device will join the belt 42 at position 72, move with the belt 42 to position 73, disengage from beneath the belt 42 and quickly return to position 72.

The upper flexible impermeable membrane 53 is arranged as an endless belt of the same width or slightly narrower than the filter belt 42. The membrane belt 53 passes over three rollers, 74, 75 and 76. Roller 74 is positioned above the belt filter to allow the membrane belt 53 to lay down upon the top surface of filter cake 43 just before the dewatering action commences. The membrane belt 53 is then moved forward at the same speed as the filter belt 42 and peeled away from the filter cake 43 by roller 75 and a mechanical scraper or air knife at position 77, when the dewatering action has been completed. The membrane belt 53 is then returned via roller 76, and during the return period it may be continuously cleaned by means of brushes and water sprays (not shown) if necessary.

A second application of a device as shown in FIG. 9 is as a filtration and dewatering panel for a rotary drum vacuum filter as shown in FIG. 12.

Such a device is used as each of a plurality of panels 80 of a drum filter 81 the interior of which forms a common equivalent of chamber 48 in FIG. 9 for all the panels. All the drainage pipes 47 connect to a rotary multi ported valve 88 which is connected to a stationary vacuum pipe 90 and a stationary blowing pipe 89. The holes in the perforated support plates 46 connect directly to the interior of the drum filter 81, and via pipe 86 fitted with bellmouth 87, to a system generating an oscillating air flow. Suitable systems are shown in FIG. 10. The rotary valve 88 contains three stationary dividing vanes 83, 84 and 85 that form seals against the rotating part 82. In normal operation a vacuum is applied to the spaces between vanes 83 and 84, and 84 and 85. Either atmospheric or a positive pressure is maintained between vanes 85 and 83 so as to aid filter cake removal. As the drum filter 81 rotates the action of drainage pipes 47 and rotary valve 88 is to cause filtration to occur in the panels 80 that lie within the arc of vanes 83 and 84, to cause cake dewatering in the panels 80 that lie within the arc of vanes 84 and 85, and to promote filter cake discharge in the arc between vanes 85 and 83. Throughout the dewatering arc the oscillating flow of air into and out of the drum filter 81 will cause the filter cake on the outside of panel 80 first to bend away from the axis of the drum filter 81 and then to bend towards this axis. The bending action will be repeated so long as the oscillating flow of air is maintained. An endless belt flexible impermeable membrane 53 of the same width as the drum 81 is arranged to pass over the top of the filter drum 81 and around rollers 74, 75 and 76. Roller 74 is positioned so that the membrane belt 53 lays down upon the filter cake (not shown) just before dewatering begins, and is peeled away after dewatering is completed by means of roller 75 and a mechanical scraper or air knife at position 77. Membrane belt 53 is returned by means of rollers 76, and during the return period it may be washed by brushes and water sprays (not shown) if necessary.

I claim:

1. A method of filtering a slurry, comprising confining filter cake produced from the slurry in an enclosure having a pair of opposed walls at least one of which is flexible and at least one of which is constituted by a filter and drainage medium; compressing the filter cake in the enclosure; and cyclically deforming the filter cake while under compression in the enclosure by acting on at least one of the walls of the enclosure while supporting the compressed filter cake at a plurality of discrete positions within its periphery whereby the unsupported parts of the filter cake are cyclically deformed about the periphery and said discrete positions of support of the filter cake.

2. A method as claimed in claim 1, in which said supporting of the filter cake is effected by fastening the filter and drainage medium flexible wall or one of such walls at discrete positions to prevent movement thereof.

3. A method as claimed in claim 1, in which the compressed filter cake is urged against a surface having a plurality of cavities of non-uniform depth into which the enclosure and filter cake are deformed, said supporting of the filter cake being effected by the edges of said cavities.

4. A method as claimed in claim 3, in which the surfaces of the cavities are ribbed or pimpled.

5. A method as claimed in claim 1, in which compression of the filter cake in the enclosure is obtained by the application of subatmospheric pressure to the inside of the enclosure and atmospheric or superatmospheric pressure to the outside of said walls of the enclosure.

6. A method as claimed in claim 1 in which the filter cake in the enclosure is compressed by fluid pressure acting on at least one flexible wall of the enclosure, the cyclic deformation of the compressed filter cake being effected by pressure oscillations induced in said fluid pressure.

7. Apparatus for filtering a slurry, comprising an enclosure having a pair of opposed walls at least one of which is flexible and at least one of which is constituted by a filter and drainage medium; means to maintain filter cake produced from the slurry under compression in the enclosure; means to support the compressed filter cake at a plurality of discrete positions within its periphery; and means for cyclically deforming the filter cake while under compression in the enclosure by acting on at least one of the walls of the enclosure whereby the unsupported parts of the filter cake are cyclically deformed about the periphery and said discrete postions of support of the filter cake.

8. Apparatus as claimed in claim 7, in which said walls of the enclosure each comprise an outer flexible membrane impermeable to fluids.

9. Apparatus as claimed in claim 8, in which said flexible membrane at a wall of the enclosure comprising the filter and drainage medium is supported by a rigid perforated plate, the flexible membrane being secured to the plate at said discrete positions of support of the filter cake.

10. Apparatus as claimed in claim 9, in which the means for cyclically deforming the compressed filter cake is an enclosed space one wall of which is formed by the perforated plate, and means for varying the pressure in the enclosed space, the peak pressure being such as to deform the filter cake, the filter and drainage medium and the flexible membrane.

11. Apparatus as claimed in claim 10, in which the means for varying the pressure in the enclosed space comprises a valve system whereby the enclosed space is alternately connected to the pressure and then suction side of a pump or fan.

12. Apparatus as claimed in claim 11, in which the valve system comprises a pair of continuously rotating synchronised butterfly valves.

13. Apparatus as claimed in claim 9, including an aperture in the flexible membrane at one of the support positions, and means to connect the aperture to a source of suction so as to transmit this suction to the filter and drainage medium and thereby extract liquid from the filter cake.

14. Apparatus as claimed in claim 9, in which the perforated plate is corrugated in such a manner that the peaks of the corrugations lie beneath the flexible membrane support points and the troughs lie between such points.

15. Apparatus as claimed in claim 7, in which the means to support the compressed filter cake comprises a plate having a surface formed with a plurality of cavities of non-uniform depths into which the enclosure and filter cake are deformed, said supporting of the filter cake being effected by the edges of said cavities.

16. Apparatus as claimed in claim 15, in which the enclosure is contained between two of said plates facing each other with their support points aligned.

17. Apparatus as claimed in claim 15, in which the surfaces of said cavities are ribbed or pimpled.

18. Apparatus as claimed in claim 7, in which the filter and drainage medium comprises a layer of filter cloth and a layer of drainage mesh.

19. Apparatus as claimed in claim 7, in which the filter and drainage medium comprises a layer of filter cloth and a flexible membrane having a rough surface adjacent the layer of filter cloth.

* * * * *